United States Patent Office 3,205,965
Patented Sept. 14, 1965

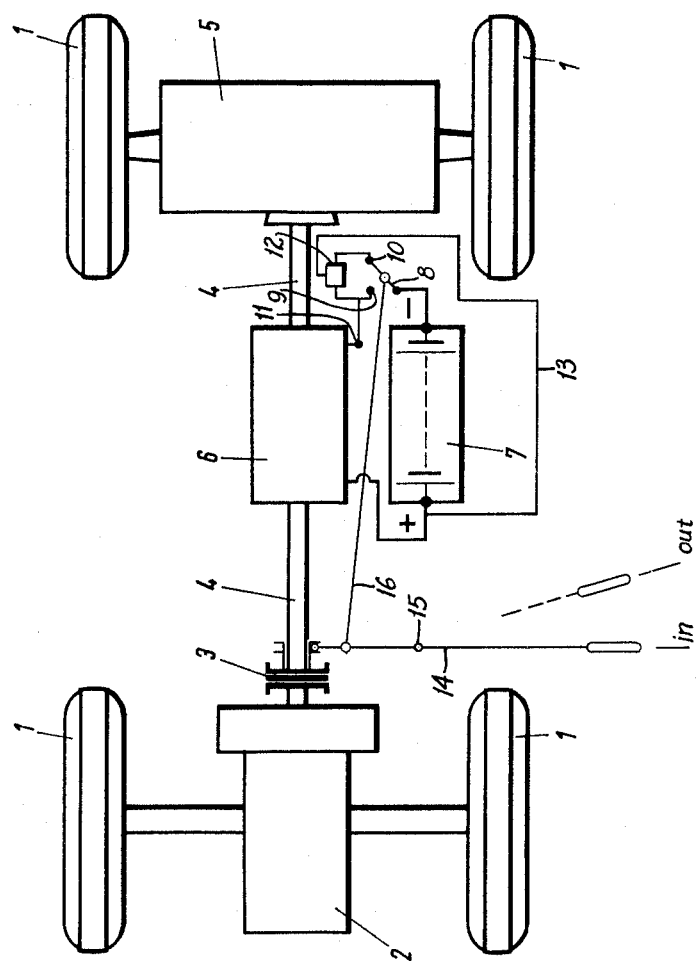

3,205,965
MOTOR VEHICLE
Rudolf Roth, Haibach, Germany, assignor to Gesellschaft für Linde's Eismaschinen Aktiengesellschaft, Wiesbaden, Germany
Filed July 26, 1962, Ser. No. 212,646
Claims priority, application Germany, Aug. 4, 1961,
G 32,870
2 Claims. (Cl. 180—65)

The present invention relates to a motor vehicle, more particularly, to a motor vehicle having an internal combustion engine as a power plant from which the power is transmitted to the wheels by an infinitely variable transmission.

Many types of vehicles, constructed for special applications, such as lift trucks and the like, must be operated both within the buildings of an industrial plant and outdoors when travelling from one building to another. In many industrial firms the distances between buildings, warehouses, ware-road sidings and the like are so long that the vehicle must spend a considerable amount of time outdoors. When the vehicle is operated under such normal conditions, it is desired that the vehicle operate as economically as possible, which means that the cost of operating the vehicle per mile, loaded or unloaded must be kept to a minimum. Accordingly, in most cases such vehicles are provided with internal-combustion gasoline or diesel engines as power plants.

With vehicles equipped with such power plants, however, a further problem frequently arises when such vehicles are being operated within buildings, particularly in buildings such as warehouses, where readily inflammable materials are stored so as to provide relatively narrow passages for movement of the vehicle. Thus, these vehicles must be constructed so as not to discharge waste gases of combustion which may be hot or include glowing particles which could serve to ignite inflammable materials or even gases in the atmosphere as encountered in some industrial plants.

In certain industrial concerns where the nature of the operations are such that high safety standards prevail, such vehicles must not contain any parts which are heated above a predetermined temperature.

Thus, the problem arises in the construction of such vehicles, since it is more economical to move loads over large distances outdoors by a vehicle powered with a diesel motor, whereas under the conditions prevailing inside industrial buildings where fire or explosion hazards exist, such loads are preferably moved by a vehicle driven by an electric motor. It is, however, most uneconomical to shift the load from a vehicle driven by a diesel engine to a vehicle driven by an electric motor and vice versa whenever the load is to be transferred from outdoors to within a building or vice versa.

Furthermore, previously constructed special vehicles as described above, driven by electric motors energized by batteries were necessarily equipped with very expensive control installations to vary the voltage supply to the electric motor in order to vary the driving speed of the vehicle. As a result, considerable quantities of energy were dissipated unprofitably in the electrical resistances necessary for controlling the voltage as described.

It is therefore the principal object of the present invention to provide a novel and improved vehicle which may be readily driven by either an internal-combustion engine or an electric motor.

It is another object of the present invention to provide a vehicle equipped with both an internal-combustion engine and an electric motor either of which can be simply and economically drivingly connected to the vehicle so as to drive the vehicle under the most economical conditions.

It is a further object of the present invention to provide a vehicle which can either be driven by an internal-combustion engine outdoors or by an electric motor within a building so as to eliminate the necessity for transferring the load from one type of vehicle to another when the load is being moved from the indoors to the outdoors or vice versa.

According to the present invention the vehicle disclosed herein essentially comprises an internal-combustion engine from which power is transmitted to the wheels of the vehicle by an infinitely variable hydraulic transmission. A clutch is drivingly connected between the engine and the transmission so as to readily engage or disengage the transmission from the engine. An electric motor which is operable as a generator is also drivingly connected to the transmission between the transmission and the clutch. A battery is provided to energize the electric motor. A switch is provided between the electric motor and the battery and operates in conjunction with the clutch so that the battery energizes the motor to drive the same when the clutch is disengaged and the battery is charged by the motor acting as a generator when the clutch is engaged and the engine drives the transmission.

Other objects and advantages of the present invention will be apparent upon reference to the accompanying description, when taken in conjunction with the drawing which schematically shows a top-plan view of a vehicle constructed in accordance with this invention.

The vehicle of the present invention comprises a frame which is not shown in the drawing, and which is supported upon 4 wheels indicated at 1 and which has a diesel engine 2 mounted at one end thereof. The diesel engine 2 has an output shaft which is connected to one side of a releasable clutch 3, the other side of which is connected to a drive shaft 4. The drive shaft is connected to an infinitely variable hydraulic transmission 5 which in turn is drivingly connected to a pair of the wheels 1. The transmission may be of the turbo-type or hydrostatic type wherein the power transmitted to the wheels may be infinitely varied over a wide range.

A direct-current shunt-wound motor 6 is mounted on the drive shaft 4 so that the shaft 4 is the output shaft of the motor. The motor 6, which is also operable as a direct-current generator, is connected to a battery 7 through a switch 8.

A hand lever 14 is shown on the drawing as pivotable about an axis 15 in the vehicle frame and actuating the clutch 3. The positions of the lever for the "in" and "out" positions of the clutch are indicated. The drawing shows the lever in the "in" position. The terminal 11 of the electric motor 6 is connected to the contact 9 of the switch 8. The switch lever 8 is connected to the lever 14 by a push rod 16. The second contact 10 of switch 8 is connected to terminal 11 through the load control device 12. The latter is also connected through conductor 13 with the second terminal of battery 7. Load control devices such as 12 serve to provide the required circuit when the voltage of the motor, during its operation as a generator, is greater than the voltage of the battery, and conversely to automatically break the connection when the battery voltage is larger than the motor voltage.

When the vehicle is being operated outdoors, the clutch 3 is actuated to the engaged positions so that the drive shaft 4 is drivingly connected to the diesel engine 2 which, accordingly, transmits power through the hydraulic transmission 5 to the driving wheels of the vehicle. When the vehicle reaches an area either outdoors or indoors, where the operation of the diesel engine constitutes a fire or explosion hazard, the clutch 3 is disengaged, the diesel engine 2 shut down and the switch 8 simultaneously closed so that the electric motor 6 is energized by the battery 7 to drive the vehicle through the hydrauilc transmission 5. The speed of the vehicle is determined by the infinitely variable hydraulic transmission 5 both when the vehicle is driven by the diesel engine and when the vehicle is driven by the electric motor. This is a distinct advantage since it eliminates the possibility that the driver of the vehicle may make operating errors with respect to the vehicle because the driver has failed to determine which drive is being utilized at that particular time.

Since the electric motor 6 is also operatable as a generator, the battery will be charged by the motor acting as a generator as long as the connection between the motor and the battery is not open. This connection would be open either because the battery is fully charged or because it is desired to utilize the greater power output of the internal-combustion engine, such as when the vehicle is to be driven outdoors or upon a steep grade. Thus, it is not necessary to provide special charging stations for the vehicles and the vehicles may remain in operation during that time that their batteries are being charged.

The switching of the drive from the diesel engine to the electric motor changes nothing with respect to the drive of the vehicle since in both cases power is transmitted either from the diesel engine or the electric motor to the hydraulic transmission which in turn drives the vehicle.

A circuit breaker may be provided between the electric motor and the battery which is operatively connected with the actuating mechanism for the clutch, so that when the clutch is disengaged to release the driving connection between the transmission and the engine, the electric motor is immediately connected as a motor to drive the transmission. This structure eliminates the possibility of operating errors when changing from one drive to another.

Thus it can be seen that the present invention provides a vehicle which can be readily driven either by an internal-combustion engine or an electric motor. This vehicle is easy to operate and operates economically under all conditions and in its normal outdoor operation it has an unlimited radius of action. Further the vehicle can be operated during an unlimited period at the highest possible traction power, i.e. through the internal-combustion engine. When the vehicle is driven by the electric motor, it can be operated without fire or explosion dangers and further operated noiselessly and without objectionable odors. The same vehicle can be used to move loads from the indoors to the outdoors and vice versa and the necessity for changing the load from one vehicle to the other is eliminated.

It will be understood that this invention is susceptible to further modification and, accordingly, it is desired to comprehend such modifications within this invention as may fall within the scope of the appended claims.

What is claimed is:

1. A wheeled vehicle comprising an internal combustion engine having an output shaft, a controllable infinitely variable hydraulic transmission drivingly connected to the vehicle wheels, a drive shaft connected to said hydraulic transmission, a clutch drivingly connecting said engine output shaft and said drive shaft, a shunt-wound electric motor operable as a generator mounted on said drive shaft with said drive shaft operating as the output shaft of said motor, and a battery connectable to said electric motor in response to the actuation of said clutch to energize the same.

2. A vehicle comprising a plurality of pairs of wheels, an internal combustion engine having an output shaft for driving the vehicle, a controllable infinitely variable hydraulic transmission drivingly connected to a pair of said vehicle wheels, a drive shaft connected to said hydraulic transmission, a clutch drivingly connecting said engine output shaft and said drive shaft, an electric motor operable as a generator mounted on said drive shaft with said drive shaft operating as the output shaft of said motor, a battery connectable to said electric motor to energize the same, and means for connecting said battery to said electric motor to energize the motor in response to the disengagment of said clutch and for connecting said battery to be charged by the operation of the motor as a generator when the clutch is engaged.

References Cited by the Examiner

UNITED STATES PATENTS

| | | | |
|---|---|---|---|
| 1,323,500 | 12/19 | Stephenson | 290—19 |
| 1,606,547 | 11/26 | Ward | 180—65 |
| 1,664,562 | 4/28 | Jensen | 290—16 |
| 1,773,587 | 8/30 | Lape | 180—66 |
| 1,824,014 | 9/31 | Froelich | 290—16 |
| 2,589,863 | 3/52 | Quartullo | 180—65 |

A. HARRY LEVY, *Primary Examiner.*

PHILIP ARNOLD, *Examiner.*